United States Patent [19]

Sklenak et al.

[11] Patent Number: 5,277,703
[45] Date of Patent: Jan. 11, 1994

[54] METHOD AND APPARATUS FOR REMOVING RADON DECAY PRODUCTS FROM AIR

[75] Inventors: John S. Sklenak, Sudbury; Sol Aisenberg, Natick, both of Mass.

[73] Assignee: Raytheon Company, Lexington, Mass.

[21] Appl. No.: 869,691

[22] Filed: Apr. 16, 1992

[51] Int. Cl.$^5$ .............................. B03C 3/10
[52] U.S. Cl. .......................... 95/77; 96/94; 96/96
[58] Field of Search .......... 55/2, 66, 149, 150, 55/151, 152, 14

[56] References Cited

U.S. PATENT DOCUMENTS

| | | | |
|---|---|---|---|
| 1,067,974 | 7/1913 | Cottrell | 55/2 |
| 1,507,687 | 9/1924 | Schmidt | 55/138 |
| 1,980,521 | 11/1934 | Hahn | 55/2 |
| 2,556,982 | 6/1951 | Roos et al. | 55/154 |
| 4,596,585 | 2/1986 | Moeller et al. | 55/2 |

FOREIGN PATENT DOCUMENTS 507914  9/1930  Fed. Rep. of Germany ........ 55/152

*Primary Examiner*—Bernard Nozick
*Attorney, Agent, or Firm*—William R. Clark; Richard M. Sharkansky

[57] ABSTRACT

Method and apparatus for removing radon decay products wherein a fan directs air through a conductive cylinder that is grounded. Positioned axially within the cylinder is one or more cylindrical brushes, each having a shaft and radially extending conductive bristles with distal ends spaced from the cylinder. The shaft is connected to the fan so that the bristles rotate. Also, a static electric potential is applied to the bristles. The relative motion of the air and bristles is particularly effective at enhancing molecular diffusion to cause small unattached radon decay products to plate out on the bristles. In contrast, the electrostatic charging of the bristles and the resulting diffusion charging is particularly effective at exerting a force on larger particles to which radon decay products are attached thus causing the particles to migrate and plate out on the cylinder.

19 Claims, 2 Drawing Sheets

METHOD AND APPARATUS FOR REMOVING RADON DECAY PRODUCTS FROM AIR

BACKGROUND OF THE INVENTION

This invention generally relates to method and apparatus for reducing health risks associated with radon, and more particularly relates to removing both attached and unattached radon decay products from air.

As is well known, radon is a naturally occurring radioactive gas that is one stage of a natural radioactive process, known as decay, where larger, more complex elements such as uranium and radium break down into smaller elements and energetic particles. More specifically, the radioactive decay of radium 226 produces the inert radioactive gas radon which is free to diffuse through porous soils and construction materials and eventually enter the environment within a building.

As is also well known, high levels of radon gas can lead to a health hazard, and this is especially true in modern energy efficient homes where levels can build up because there is little exchange of indoor and outdoor air. Radon gas itself is relatively harmless. However, when radon gas decays, a series of radon decay products commonly referred to as radon daughters or daughter particles are created, and alpha and beta particles are emitted. The radon decay products can readily attach themselves to airborne particles such as dust and, in such state, are commonly referred to as attached radon decay products or daughter particles. The effective size of such attached particles ranges from 0.05 to a few micrometers in diameter. Depending on the concentration of dust or similar airborne particles in the air, up to 20% of the radon daughter particles or decay products will not attach to dust particles and remain in a free ion state typically having a diameter of less than 3.0 nanometers. Whether the radon decay products are attached or unattached, they only pose a serious health risk if they are inhaled into the lungs where they can emit damaging particles into nearby cell tissue. Therefore, it is desirable to remove both attached and unattached radon decay products from the air before they are inhaled. Various prior art methods or approaches have been used in an attempt to remove airborne radon decay products.

One prior art approach for removing airborne radon decay products is to pass room air through an air filter such as a conventional electrostatic filter or a filtration device that collects particles on a filter media such as fiber glass matting. This approach, however, has serious drawbacks. The attached radon decay products may be effectively removed because they are attached to relatively large airborne particles such as dust which may, as described above, have an effective diameter of 0.05 micrometers or larger. However, such air filters are generally not effective for filtering out the much smaller unattached radon decay products having a diameter of 3.0 nanometers or less. Further, because the filtering process removes dust from the air, there are fewer airborne particles such as dust to which the unattached radon decay products can attach; therefore, the concentration of unattached particles may actually increase. It is further believed that the unattached radon decay products are more harmful or potentially more dangerous than attached radon decay products because the smaller unattached particles have a higher probability of being deposited deep into the lungs. In contrast, the larger attached particles have a higher probability of being deposited in the upper lung where they can be cleared away by the ciliated mucus lining. Therefore, the net effect of removing attached particles and increasing the concentration of unattached particles may actually increase the radon health hazard.

Another prior art approach described in U.S. Pat. No. 4,596,585 issued Jan. 24, 1986 to Moeller et al. uses a tandem approach combining the two air treatment methods of (a) turbulent convection using a ceiling fan and (b) unipolar space charging employing an ion generator. Specifically, the tandem air treatment method is implemented by directly coupling an air ionizer with a ceiling fan. The highly diffusive nature of unattached particles in the size range of 0.001 to 0.01 micrometers favors their removal from the air by deposition or plating-out as a result of molecular diffusion. The fan attempts to enhance this process by creating air turbulence that has been reported to reduce the boundary layer thickness at the surface to air interface throughout a room and reducing the distance that unattached decay products must travel by molecular diffusion before depositing onto room surfaces. The net result is a higher flux of unattached decay products plating onto the walls of the room and a corresponding reduction in the airborne concentrations of such unattached decay products. The air ionizer portion of the tandem was reported to operate by providing mutual repulsion of the air ions in the vicinity of a strong unipolar point source thereby creating a spatial distribution of airborne charge and an electric field gradient directed radially from the source. By the process of diffusion charging, decay product atoms as well as airborne particles to which some decay products are attached, become charged to the polarity of the ion generator. The force exerted by the electric field on these charged particles causes their migration towards the boundaries of the air space thereby resulting in deposition or plating-out on wall or ceiling surfaces.

The method and radon removing apparatus described in U.S. Pat. No. 4,596,585 have drawbacks. First, with such arrangement, the rate of plate out is very dependent upon the physical parameters of the room such as its size, layout, texture of surfaces, etc. Therefore, the removal rate of radon decay products is also very dependent on such room parameters, and it is undesirable to have to match the radon removing apparatus to a particular room. Further, the walls and ceiling are necessarily spaced from the radon removing apparatus by a relatively large distance. Therefore, a relatively high voltage charge has to be used, and even then the removal of radon decay products may be relatively ineffective due to the large distance. Another problem is that airborne particles such as smoke and dust particles are ionized and removed from the air by plating-out on room surfaces. This leaves fewer airborne particles for the more dangerous unattached radon decay products to attach. Thus, the concentration of the more harmful airborne unattached particles may not be effectively reduced.

SUMMARY OF THE INVENTION

In accordance with the invention, apparatus comprises a duct having open ends and a shaft disposed within the duct. A plurality of conductive bristles are connected to and extending from a portion of the shaft wherein the bristles have distal ends spaced from the duct. A voltage potential is applied to the bristles, and the apparatus further comprises means for directing a flow of air in one end of the duct past the bristles and out the other end of the duct. It is preferable that the duct be cylindrical and the shaft be concentrically disposed therein with the bristles extending radially defining an envelope equally spaced from the duct along the length thereof. Preferably, the duct is conductive and grounded. Also, it is preferable that the directing means comprises a fan including a motor, a fan blade, and a fan blade shaft coupled between the fan blade and the motor. It is preferable that the apparatus further comprise means for axially rotating the portion of the shaft supporting the bristles. For example, the rotating means may comprise means for coupling and electrically insulating the bristle supporting shaft from the fan blade shaft. The apparatus may also have a plurality of stages wherein the bristles of one stage are fed by a first voltage polarity and the bristles of another stage are fed by a voltage potential of opposite polarity.

The invention may also be practiced by a method of removing attached and unattached radon decay products from air, comprising the steps of providing a conductive cylindrical duct, positioning in the duct a cylindrical brush comprising a shaft and a plurality of conductive bristles extending radially from the shaft wherein the bristles have distal ends spaced from the duct, applying an electrical voltage potential to the bristles to charge airborne particles comprising radon decay products to the polarity of the voltage potential and to exert an outward radial force on the charged particles to move them to the duct for plating-out thereon, rotating the shaft of the brush to plate-out others of the radon decay products on the bristles, and directing a flow of air through the duct.

With such arrangement, both attached and unattached radon decay products or daughter particles are effectively removed from the air that is drawn through the duct. The small unattached radon decay products are effectively removed by plating-out on the moving bristles. More particularly, the bristles function as pseudo fan blades and the turbulence enhances the effect of molecular diffusion in plating-out the unattached radon decay products on the bristles. Larger airborne particles such as dust to which radon decay products are attached are effectively removed from the air by the force exerted by the electric field on charged particles. More particularly, the high electrostatic voltage on the brush causes the bristles to function as an ion generator imparting a like charge by charging diffusion on previously uncharged particles. The charged particles are then repelled outwardly to plate-out on the conductive duct. Thus, the concentrations of attached and unattached radon decay products are removed from the air.

BRIEF DESCRIPTION OF THE DRAWINGS

The foregoing objects and advantages will be more fully understood by reading the following description of the preferred embodiment with reference to the drawings wherein.

DESCRIPTION OF THE PREFERRED EMBODIMENTS

Figure 1:
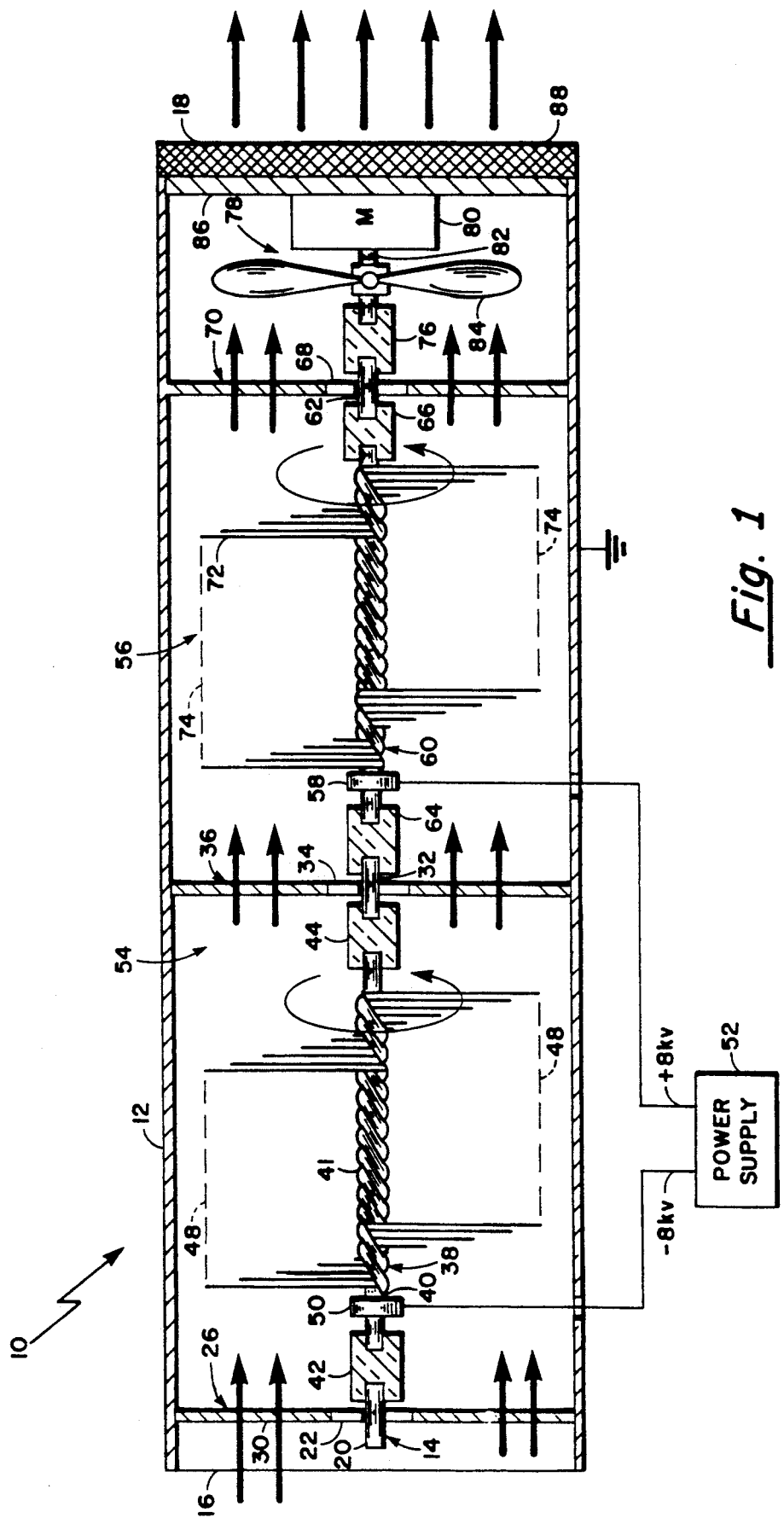
FIG. 1 is a partially sectioned side view of an air treatment system particularly adapted for removing attached and unattached radon decay products from the air.
Figure 2:
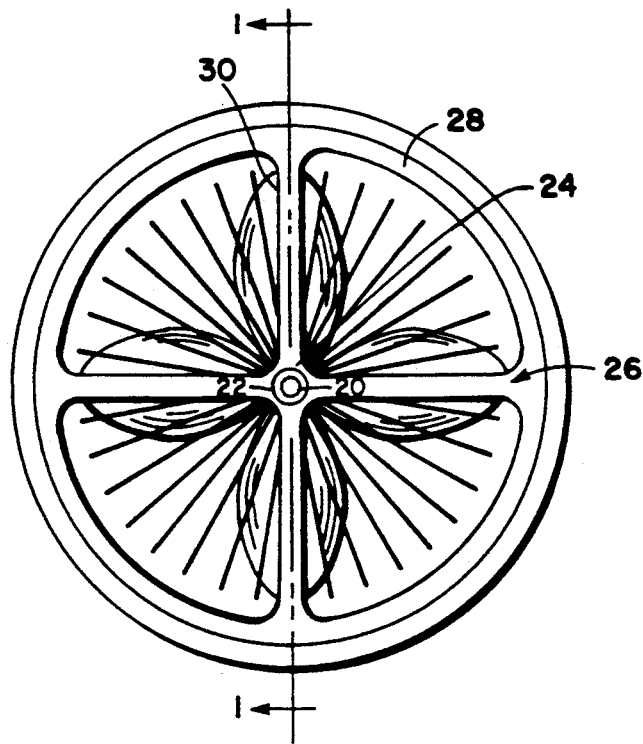
FIG. 2 is an end view of the air treatment system.

Referring to FIGS. 1 and 2, an air treatment system 10 adapted for the removal of radon decay products from air is shown. System 10 has an outer cylindrical conductive duct 12 or cylinder which surrounds and encases the rest of the system. As will be described later, system 10 may have one or more stages, and, in a preferred embodiment, duct 12 may have a diameter of approximately 8" and each stage may have a length of approximately 16". It is preferable that duct 12 be made of a conductive material that can be held at a predetermined voltage potential or ground.

A shaft 14 extends axially down the center of duct 12 from an open intake end 16 to an open outlet end 18. As shown, shaft 14 is made up of a number of component parts. More particularly, starting from intake end 16, shaft 14 first includes shaft stub portion 20 that is seated in sleeve bushing 22 that supports stub portion 20 for axial rotation. Sleeve bushing 22 is mounted in the hub 24 of sleeve bushing support 26 as shown best in FIG. 2. Sleeve bushing support 26 has an annular rim 28 which is nested inside of duct 12, and spokes 30 support hub 24 so that air can be drawn into the intake end 16 of duct 12. Similarly, shaft stub portion 32 is supported in sleeve bushing 34 which is supported by sleeve bushing support 36. Metal brush 38 is supported for axial rotation between stub portions 20 and 32. In particular, metal brush 38 has a central shaft 40 having ends respectively coupled to stub portions 20 and 32 by suitable electrically insulative couplings 42 and 44. Any of a number of suitable couplings could be used to permit metal brush 38 to rotate axially while being electrically insulated from stub portions 20 and 32. For reasons to be described later herein, metal brush 38 is charged to an electric potential, and it is desirable that the potential be insulated from the entire shaft 14 and duct 12. In one embodiment that is particularly easy to manufacture, metal brush 38 is a conventional chimney sweep brush having a central shaft 40 made up of a plurality of metal rods 41 through which metal wires are inserted before the metal rods 41 are twisted to secure the wires and form bristles 46 that extend radially and emanate in a helical arrangement around and along shaft 40. In any event, metal brush 38 has a central shaft 40 from which metal bristles 46 or prongs extend radially forming a cylindrical envelope 48 within duct 12. The spacing between envelope 48 and the inner surface of duct 12 may depend on various parameters of the system to be discussed subsequently, but generally it should be large enough to provide sufficient radial clearance to prevent voltage breakdown between bristles 46 and duct 12 in order to minimize ozone generation. A slip ring 50 or similar suitable voltage coupling apparatus such as a brush assembly having a conductive wiper is connected to central shaft 40 to provide an electrostatic potential such as −8 Kv from power supply 52 to metal brush 38 as it rotates in a manner to be described. In one embodiment, metal brush 38 has 360 bristles 46 each being approximately 4" in length extending radially in a helical orientation from a portion of central shaft 40 which is approximately 6" long. The above description completes the first stage 54 of air treatment system 10.

A second stage 56 includes the same or similar parts except that slip ring 58 is connected to a voltage potential of opposite polarity on power supply 52. That is, as shown here, slip ring 58 is connected to a +8 Kv terminal of power supply 52. In particular, the second stage 56 has a metal brush 60 supported between stub portion 32 and stub portion 62 by electrical insulative coupling 64 and 66. Shaft stub portion 62 is supported in sleeve bushing 68 which is supported by sleeve bushing support 70. Metal brush 60 has metal bristles 72 which extend radially outward to form a cylindrical envelope 74 which is spaced from the inner surface of duct 12.

Stub portion 62 is connected by electrically insulative coupling 76 to fan 78. More specifically, fan 78 includes a motor 80, shaft 82, and fan blades 84. The insulative coupling 76 is connected to shaft 82. Motor 80 is supported by fan support 86. Optionally, an ozone reducing charcoal filter 88 covers the outlet end 18 of duct 12.

Figure 3:
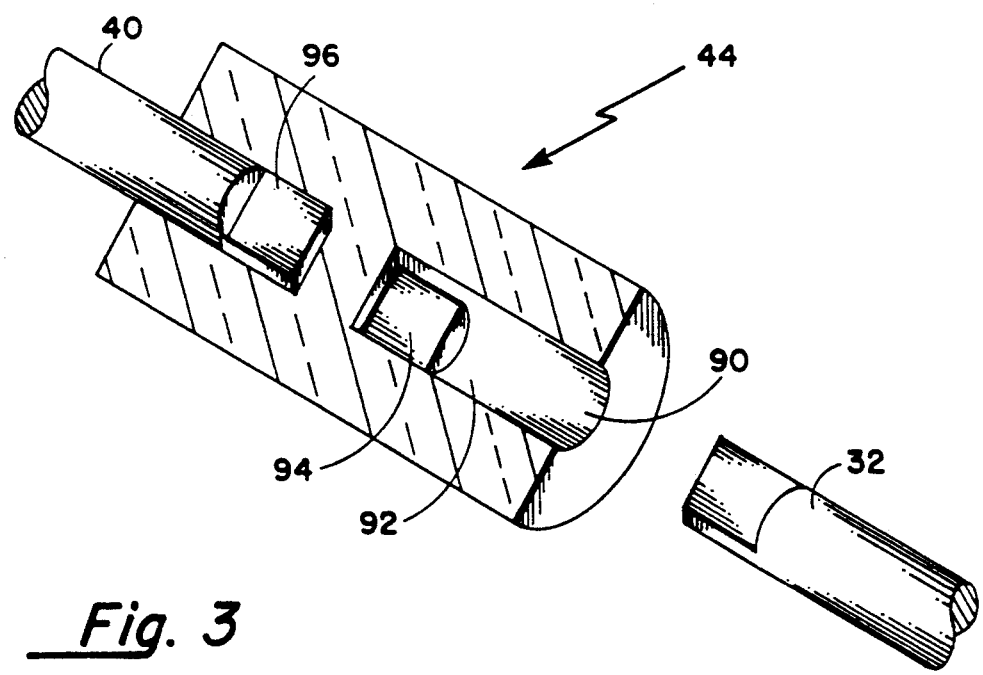
FIG. 3 is a sectioned perspective view of an electrical insulative coupling.

Referring to FIG. 3, one embodiment of electrical insulative couplings 42, 44, 64, 66, and 76 is shown. Here, each coupling has a bore 90 protruding into each end, and each bore 90 has a cylindrical entrance portion 92 leading to a rectangular terminating portion 94. Each respective inserting shaft portion 20, 40, 32, 62, and 82 terminates with a rectangular tongue portion 96 which is adapted to be received in and mated with a respective rectangular terminating portion 94. With such arrangement, the torque of the respective drive shafts 82, 62, 32, and 40 on one side is coupled to the respective driven shafts 62, 32, 40 on the opposite side, but the respective component shafts of shaft 14 can readily be assembled and disassembled for cleaning.

In operation, motor 80 is activated and fan blades 84 rotate to draw air in the intake end 16 of duct 12 down the longitudinal length of duct 12 and out the outlet end 18. As described heretofore, shaft 82 of fan 78 is coupled to metal brush 60 and 38 respectively, which are also axially rotated at the same speed. In an alternate embodiment, a speed reducer could be disposed between fan 78 and brushes 60 and 38 so that the brushes would rotate at a slower speed. Power supply 52 is also activated and provides metal brush 38 through slip ring 50 with a negative voltage potential of 8 Kv and metal brush 60 through slip ring 58 with a positive voltage potential of 8 kv.

Air treatment system 10 operates by drawing air into intake end 16, removing particles including attached and unattached radon decay products from the air, and then expelling purified air from outlet end 18. Unattached radon decay products may typically have a size of approximately 3 nanometers in diameter or less, and attached radon decay products may typically have an effective size in the range from 0.05 to a few micrometers in diameter. Air treatment system 10 has at least two different particle removal mechanisms or techniques: one is particularly effective at removing the unattached radon decay products from the air, and the other is particularly effective at removing the attached radon decay products from the air.

In "The Reduction Of Airborne Radon Daughter Concentration By Plateout On An Air Mixing Fan", *Health Physics*, Vol. 36, No. 4, P. 497 (1979), Holub et al. report that it was found that the operation of a fan reduced radon decay product levels in the air by a factor of about two. The initial hypothesis was that the air motion would cause the radon decay products to plate out on the walls of the room resulting in the observed decrease in the concentrations of radon decay products in the air. However, Holub et al. reported that the decrease in concentration was due entirely to the deposition on the fan blades themselves rather than the walls. In "Effects Of Indoor Air Circulation Systems On Radon Decay Product Concentrations", Final Report on USEPA Contract No. 68-01-6050, February 1982, U.S. Environmental Protection Agency, Washington, D.C., Rudnick et al. report that turbulent mixing of air was effective in removing airborne unattached radon decay products which typically have diameters in the range of 0.001 to 0.01 micrometers. They reported that the highly diffusive nature of particles in this size range favors their removal from the air space by deposition onto surfaces by molecular diffusion. They also reported that the turbulent flow created by a fan facilitates such deposition because the air turbulence, in effect, reduces the boundary layer thickness at the surface to air interface throughout a room. As a consequence, the distance that unattached radon decay products must travel by molecular diffusion before depositing onto room surfaces is decreased.

Referring again to air treatment system 10, each of the bristles 46 and 72 functions as a "pseudo fan blade," and in the manner reported by Holub et al., the unattached radon decay products plate out on the bristles 46 and 72. Turbulence to enhance plate out on the bristles 46 and 72 could be accomplished merely by drawing air through duct 12 using fan 78 without rotating brushes 38 and 60. However, in the preferred embodiment, metal brushes 38 and 60 are coupled to and rotated by motor 80 to enhance the plate out effect of unattached radon decay products on bristles 46 and 72. In short, by rotating metal brushes 38 and 60, additional turbulence is created and the probability of air including airborne particles coming into contact with the bristles 38 and 60 for plate out is enhanced. Viewed differently, rotation of brushes 38 and 60 increases the effective plating out surface area of bristles 46 and 72 thereby enhancing the removal of radon decay products, and especially unattached radon decay products.

The electrostatic charges on brushes 38 and 60 operates to remove both attached and unattached radon decay products from the air. More specifically, brush 38 is here charged to $-8$ Kv and brush 60 is here charged to $+8$ Kv. Mutual repulsion of air ions in the vicinity of a strong unipolar point which is here provided by the tips of bristles 46 and 72 creates a spacial distribution of airborne charge and an electric gradient directed radially from the source. In other words, each bristle 46 and 72 functions as an ionizing electrode that projects radially outward and acts as an ion point source. Also, there is a strong electric field between the tips of the bristles 48 and 72 and the inner surface of the metal duct 12 which is grounded. Oppositely charged particles will be attracted to and plate out on the bristles 46 and 72, while like charged particles will be repelled towards duct 12. Simultaneously, by the process of diffusion charging, radon decay products, as well as airborne particles such as dust to which the radon decay products may be attached, become charged to the polarity of the brushes 38 and 60 which function as ion generators. Once charged, the force exerted by the electric field causes the particles to migrate towards the inner surface of metal duct 12 which is held at ground potential. Upon reaching the metal duct, the charged particles, whether they be attached or unattached radon decay products, plate out on the metal duct 12. In such manner, radon decay products are removed from the air and no longer present the hazard of being inhaled into the lungs of people.

The air treatment system 10 shown in FIG. 1 has a first stage 54 and a second stage 56. In such manner, a negative and a positive ion generator and field is sequentially provided such that an airborne particle that for some reason is more effected by one particular polarity will be subjected to that polarity. Therefore, the probability of an airborne particle including attached and unattached radon decay products plating out somewhere within duct 12 is increased. In an alternate embodiment, air treatment system 10 could have only one stage, that having either a positive or a negative electrostatically charged brush. In U.S. Pat. No. 4,596,585, the positive ion source was stated to be somewhat superior to a negative ion source. Therefore, in a single stage air treatment system, it may be preferable to charge the rotating brush 60 positively to provide a positive ion generator.

This concludes the description of the preferred embodiment. However, various other modifications or alternate embodiments are possible without departing from the spirit of the invention. For example, a protective screen could be placed over the intake end 16 or outlet end 18 to prevent objects from being inserted into the rotating parts. The duct 12 could be divided up into two or more sections or segments connected by clips or snap connectors so that duct 12 could be readily disassembled and brushes 38 and 60 removed for cleaning. For example, duct sections and brushes 38 and 60 could be cleaned in a dishwasher. Further, the air treatment system 10 could be incorporated into the ducting of a hot air heating system to provide highly effective general purpose air filtration for an entire house. Therefore, it is intended that the scope of the invention be limited only by the appended claims.

What is claimed is:

1. A method of removing attached and unattached radon decay products from air, comprising the steps of:
   providing a duct having disposed therein a cylindrical brush comprising a shaft and a plurality of conductive bristles extending radially from said shaft, said bristles having distal ends spaced from said duct;
   applying an electrical voltage potential to said bristles to charge airborne particles comprising radon decay products to the polarity of said voltage potential and to exert an outward radial force on said charged particles to move them to said duct for plating out thereon;
   rotating said shaft of said brush to plate out others of said radon decay products on said bristles; and
   directing a flow of air through said duct.

2. A method of removing radon decay products from products from air comprising the steps of:
   charging a plurality of moving conductive prongs to a predetermined voltage potential; and
   passing said air through the region of said moving prongs to plate out some of said radon decay products on said prongs while repelling others of said radon decay products away from said charged prongs removing radon decay products from the air and providing air free of radon decay products.

3. The method recited in claim 2 wherein said conductive prongs are radially disposed from a shaft axially rotated to move said prongs.

4. The method recited in claim 2 wherein said prongs are disposed within a duct and said repelled radon decay products plate out on said duct.

5. Apparatus comprising:
   a duct having open ends;
   a shaft disposed in said duct;
   a plurality of conductive bristles connected to and extending from a first portion of said shaft, said bristles having distal ends spaced from said duct;
   means for applying a voltage potential to said bristles;
   means for directing a flow of air in one end of said duct past said bristles and out the other end of said duct; and
   means for axially rotating said first portion of said shaft supporting said bristles.

6. The apparatus recited in claim 5 wherein said duct is cylindrical and said shaft is concentrically disposed therein with said bristles extending radially and defining an envelope equally spaced from said duct along the length thereof.

7. The apparatus recited in claim 5 further comprising means for electrically insulating said first portion of said shaft supporting said bristles from at least one other portion of said shaft.

8. The apparatus recited in claim 5 further comprising conductive bristles connected to and extending from a second portion of said shaft electrically insulated from said first portion, said voltage potential applying means comprising means for applying a first polarity of voltage potential to said bristles of said first portion and for applying an opposite polarity of voltage potential to said bristles of said second portion.

9. The apparatus recited in claim 5 wherein said duct is conductive.

10. The apparatus recited in claim 9 wherein said duct is grounded.

11. The apparatus recited in claim 15 wherein said directing means comprises a fan.

12. The apparatus recited in claim 11 wherein said fan comprises a motor, a fan blade, and a fan blade shaft coupled between said fan blade and said motor.

13. The apparatus recited in claim 12 wherein said axially rotating means comprises means for coupling said first portion of said shaft supporting said bristles to said fan blade shaft.

14. Apparatus for removing radon decay products from air, said apparatus comprising:
   a conductive cylinder;
   an ion generator comprising a plurality of conductive prongs extending from a shaft and means for applying a voltage potential to said prongs within said cylinder to create a spacial distribution of airborne ions within said cylinder and an electric field gradient directed from said prongs to said cylinder wherein a force is exerted on charged radon decay products to urge them toward or away from said prongs to cause them to plate out on said prongs or said cylinder thereby removing them from the air;
   means for rotating said shaft and said prongs to plate out radon decay products on said prongs; and
   means for drawing a flow of air through said cylinder.

15. The apparatus recited in claim 14 wherein said cylinder is grounded.

16. The apparatus recited in claim 14 further comprising means for electrostatically charging said cylinder to a voltage potential having opposite polarity of said prongs.

17. The apparatus recited in claim 14 wherein said directing means comprises a fan.

18. The apparatus recited in claim 17 wherein said fan has a shaft connected to said shaft of said ion generator.

19. The apparatus recited in claim 18 further comprising means for electrically insulating said shaft of said fan from said shaft of said ion generator.

* * * * *